United States Patent
Jujjuri et al.

(10) Patent No.: US 9,542,403 B2
(45) Date of Patent: *Jan. 10, 2017

(54) SYMBOLIC-LINK IDENTIFYING

(71) Applicant: International Business Machines Corporation, Armonk, NY (US)

(72) Inventors: Venkateswararao Jujjuri, Beaverton, OR (US); Sripathi Kodi, Bangalore (IN); Mohan Kumar Mohan Raj, Salem (IN); Aneesh K. Veetil, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 224 days.

This patent is subject to a terminal disclaimer.

(21) Appl. No.: 14/548,733

(22) Filed: Nov. 20, 2014

(65) Prior Publication Data

US 2015/0081749 A1    Mar. 19, 2015

Related U.S. Application Data

(63) Continuation of application No. 13/450,440, filed on Apr. 18, 2012, now Pat. No. 8,930,346, which is a continuation of application No. 12/938,273, filed on Nov. 2, 2010, now Pat. No. 9,043,312.

(51) Int. Cl.
*G06F 7/00* (2006.01)
*G06F 17/30* (2006.01)

(52) U.S. Cl.
CPC ..... *G06F 17/30091* (2013.01); *G06F 17/3089* (2013.01); *G06F 17/30203* (2013.01)

(58) Field of Classification Search
CPC .................................................. G06F 17/3089
USPC ........................................................ 707/716
See application file for complete search history.

(56) References Cited

U.S. PATENT DOCUMENTS

| | | | |
|---|---|---|---|
| 7,260,718 | B2 | 8/2007 | Burnett et al. |
| 7,668,671 | B1 | 2/2010 | Gristina |
| 8,930,346 | B2 | 1/2015 | Jujjuri et al. |
| 2007/0055963 | A1 | 3/2007 | Waddington et al. |
| 2007/0162419 | A1 | 7/2007 | Ahn et al. |
| 2008/0294703 | A1 | 11/2008 | Craft et al. |
| 2009/0089395 | A1 | 4/2009 | Fen et al. |
| 2009/0106411 | A1 | 4/2009 | Lisiecki et al. |
| 2009/0254559 | A1 | 10/2009 | Nagano |
| 2012/0110018 | A1 | 5/2012 | Jujjuri et al. |
| 2012/0203927 | A1 | 8/2012 | Jujjuri et al. |

OTHER PUBLICATIONS

Non-final office action for U.S. Appl. No. 12/938,273 dated Jun. 27, 2012, 9 pp.
Final office action for U.S. Appl. No. 12/938,273 dated May 23, 2013, 13 pp.

(Continued)

*Primary Examiner* — Ajith Jacob
(74) *Attorney, Agent, or Firm* — Steven Bennett

(57) ABSTRACT

Identifying symbolic links in network file systems is provided. An absolute path may be determined at a network file server. This may include determining a complete client path from an initial client path and combining the complete client path with a server export path. Once the absolute path is determined, it may be traversed using a file descriptor of each file in the absolute path to identify a symbolic link.

20 Claims, 4 Drawing Sheets

(56) References Cited

OTHER PUBLICATIONS

Non-final office action for U.S. Appl. No. 12/938,273 dated Aug. 29, 2013, 14 pp.
Final office action for U.S. Appl. No. 12/938,273 dated Apr. 24, 2014, 13 pp.
Notice of allowance for U.S. Appl. No. 12/938,273 dated Jan. 16, 8 pp.
Non-final office action for U.S. Appl. No. 13/450,440 dated Dec. 7, 2012, 15 pp.
Final office action for U.S. Appl. No. 13/450,440 dated May 24, 2013, 15 pp.
Non-final office action for U.S. Appl. No. 13/450,440 dated Aug. 30, 2013, 15 pp.
Final office action for U.S. Appl. No. 13/450,440 dated Apr. 25, 2014, 15 pp.
Notice of allowance for U.S. Appl. No. 13/450,440 dated Aug. 20, 2014, 8 pp.
OpenBSD Programmer's Manual, OPEN(2), <http://resin.csoft.net/cgi-bin/man.cgi?section=2&topic=open>, Nov. 2, 2010, 5 pp.
"Handling Race Conditions", Programming Perl, Third Edition, Chaper 23: Security, 23.2.2. <http://docstore.mik.ua/orelly/perl/prog3/ch23_02.htm>, Jul. 21, 2000, 6 pp.

SYMBOLIC-LINK IDENTIFYING

CROSS-REFERENCE TO RELATED APPLICATIONS

This application is a continuation of U.S. patent application Ser. No. 13/450,440, filed on Apr. 18, 2012, which is a continuation of U.S. patent application Ser. No. 12/938,273, filed Nov. 2, 2010.

BACKGROUND

A network file system, also referred to as a "distributed file system," enables access to remote computer files. Network file system client computer programs, referred to herein as "network file system clients" or simply as "clients," execute on computer systems and may be provided with access to computer files on other computer systems over a computer network. In some systems, network file system clients interact with network file server computer programs (referred to herein as "network file servers") over the computer network using a protocol in order to obtain access to remote computer files. Exemplary protocols include the Network File System ("NFS") and Server Message Block ("SMB"), also referred to as the Common Internet File System ("CIFS").

In order to make a computer file available to remote computer systems, a network file server may export a portion of computer storage (e.g., its underlying file system) that contains the computer file to one or more network file system clients. The clients may be permitted to "mount" the exported portion. "Mounting" an exported portion means making the computer files within available for access and/or manipulation by the client or other applications running on the same computer system as the client. For example, Windows computer systems are able to mount remote computer file storage portions as local "drives" designated by letters (e.g., "g:\", "h:\").

Symbolic links (sometimes referred to as "soft links") are a type of computer file that is created not to hold data, as are most computer files, but instead to contain a reference to another computer file or a directory. The reference may be an absolute path, which indicates exactly where the referred-to computer file is located within computer file storage, or a relative path, which indicates where the referred-to computer file is located relative to the location of the symbolic link.

A client to which a first portion of a network file server's underlying file system is exported may not be permitted to stray from the exported portion. However, if a symbolic link is created within the exported portion that refers to a file or directory that is outside of the exported portion, then the client potentially could gain access to non-exported portions of the network file server's underlying file system.

BRIEF SUMMARY

Methods for identifying symbolic links in network file systems are provided herein. An absolute path may be determined at a network file server. This may include determining a complete client path from an initial client path and combining the complete client path with a server export path. Once the absolute path is determined, it may be traversed using a file descriptor of each file in the absolute path to identify a symbolic link.

DETAILED DESCRIPTION

Figure 1:
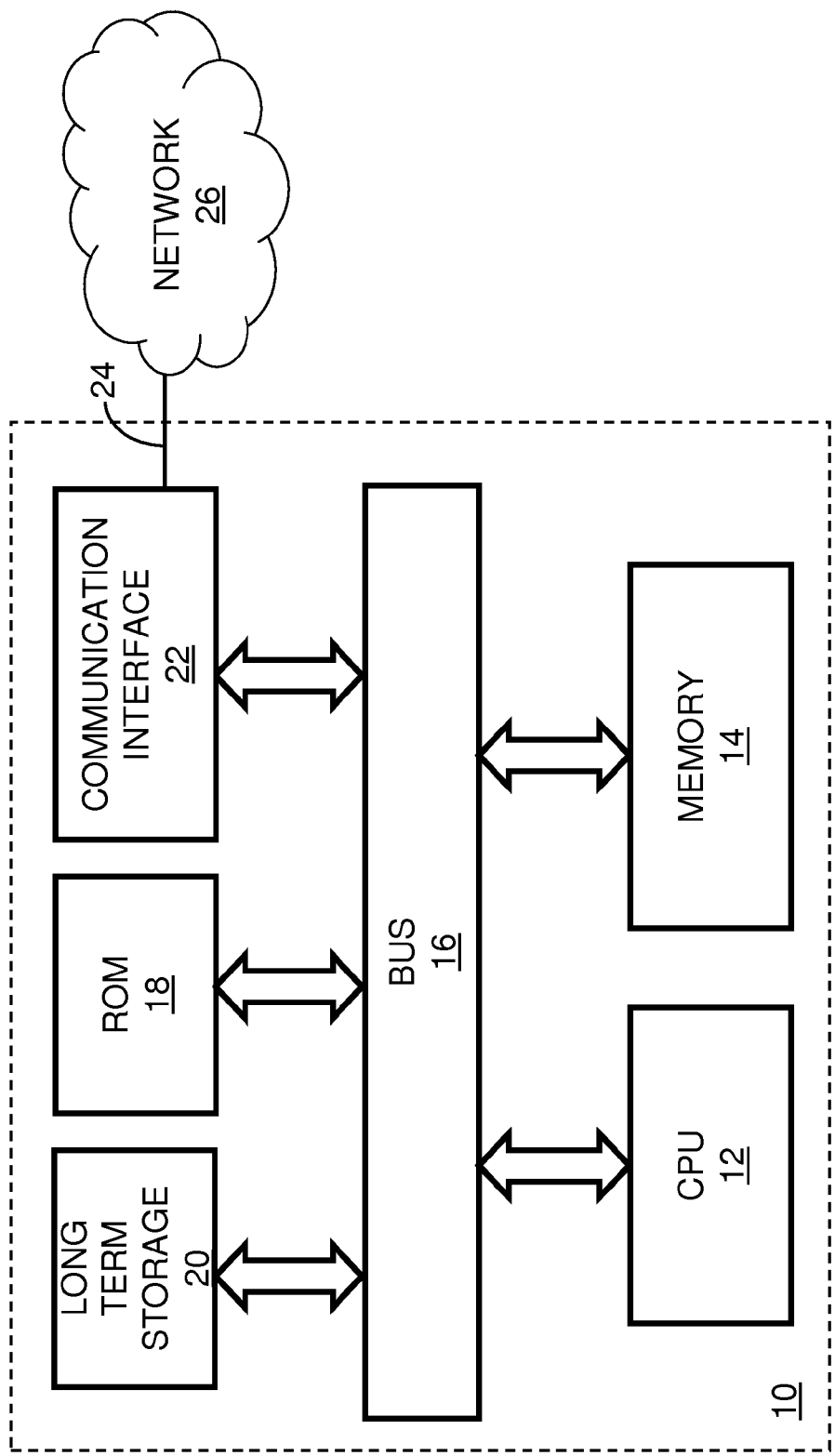
FIG. 1 depicts an exemplary data processing apparatus upon which various methods and computer programs described herein may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. As used herein, "non-transitory" computer-readable medium(s) include all computer-readable medium(s), with the sole exception being a transitory, propagating signal.

Program code embodied on a non-transitory computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider).

Aspects of the present invention are described below with reference to flowchart illustrations and/or cluster diagrams of methods, apparatus (systems) and computer program products according to embodiments of the invention. It will be understood that each cluster of the flowchart illustrations and/or cluster diagrams, and combinations of clusters in the flowchart illustrations and/or cluster diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or cluster diagram cluster or clusters.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or cluster diagram cluster or clusters.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or cluster diagram cluster or clusters.

Referring to FIG. 1, an exemplary data processing apparatus 10 is depicted. Data processing apparatus 10 may be a general or special purpose computer system such as a personal computer, a laptop computer, a computer cluster (e.g., a blade system), a web server, a database server, a smart phone, a wireless email device, a tablet computer, a personal digital assistant, a network component (e.g., firewall, router, switch) and so forth. Data processing apparatus 10 may include a central processing unit 12 ("CPU") and memory 14 (e.g., RAM) operably coupled by a bus 16. Data processing apparatus 10 may include additional components, such as ROM 18, long term storage 20 (e.g., hard disk), and one or more communication interfaces 22 through which a connection 24 may be established to communicate with other data processing apparatus over a computer network 26. Communication interface 22 may be various types of network interfaces, such as an Ethernet card, a wireless adapter, and so forth.

In a network file system, portions of computer file storage residing on one or more computer systems may be made available by a network file server to one or more network file system clients by exporting those portions to the clients. It may be undesirable for a client to obtain access to computer files outside of the portion(s) exported to the client by the network file server. Yet, a symbolic link in a portion exported to one client may refer to a computer file located in a different portion of computer storage that is not exported to that client. Allowing the client to nonetheless access this referred-to computer file may raise security issues.

Figure 2:
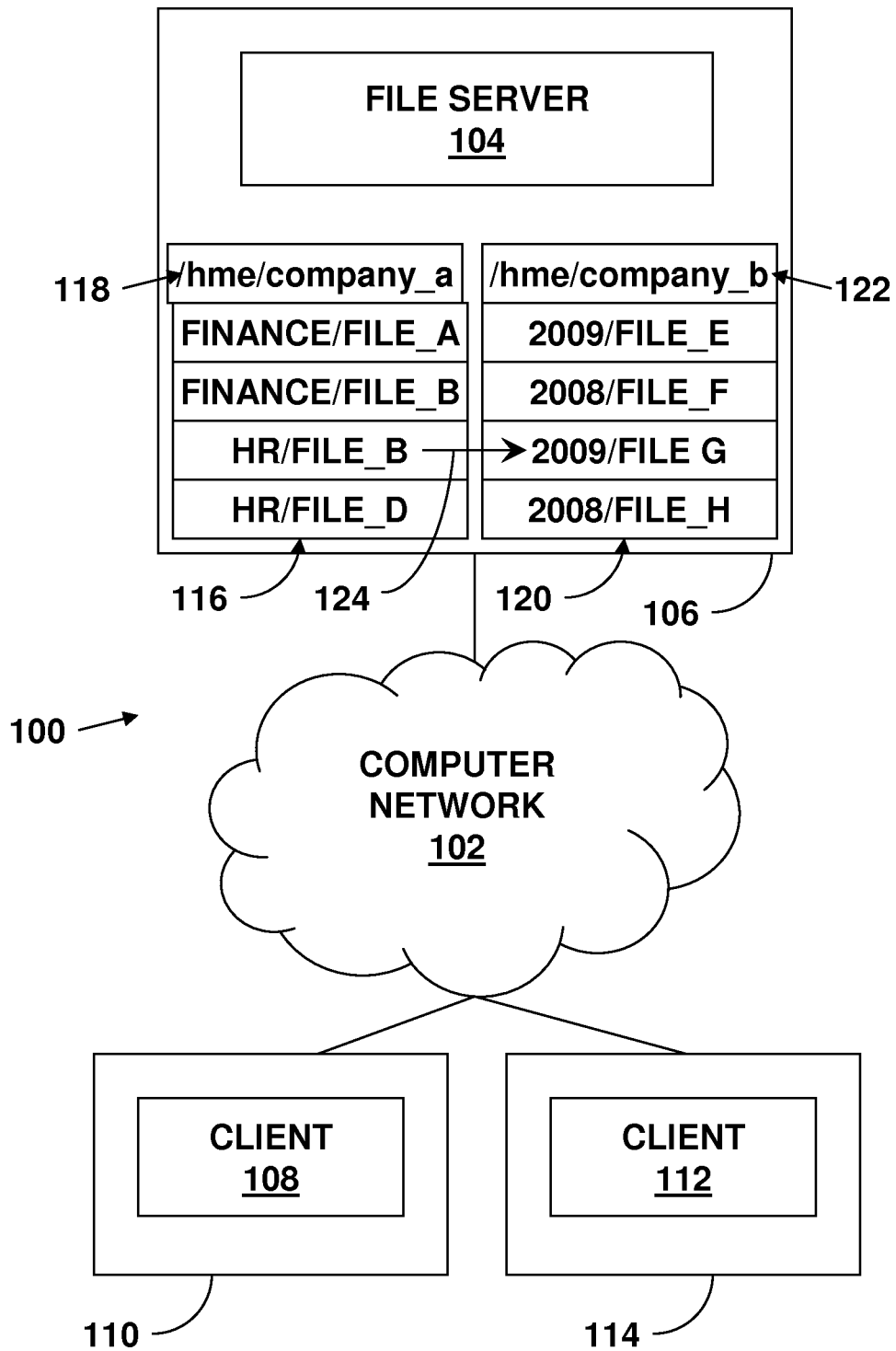
FIG. 2 depicts an example network file system that includes a symbolic link.

For example, FIG. 2 depicts an exemplary network file system 100 that includes a computer network 102, a file server 104 executing on a first computer system 106, a first network file system client 108 executing on a second computer system 110 and a second network file system client 112 executing on a third computer system 114. File server 104 may be configured to make computer files available to network file system clients such as 110 and 112 over computer network 102. In this example, these computer files are stored on first computer system 106 (e.g., in its underlying file system). However, it should be understood that a network file server may make available for access computer files stored on other computer systems besides the one on which the network file server executes.

One or more portions of computer storage of first computer system 106 may be designated as one or more server export portions for various network file system clients or groups of network file system clients. A network file server may permit a network file system client to mount a computer file storage portion by designating a server export path and exporting that path to the client (e.g., sending the path to the client in a communication).

For example, computer files A-D on first computer system 106 are contained within a first server export portion 116 designated by server export path 118 ("hme/company_a"). Computer files E-H are contained within a second sever export portion 120 designated by server export path 122 ("/hme/company_b"). File server 104 may provide first network file system client 108 with access to first server export portion 116 by giving client 108 permission to mount the file system portion "/hme/company_a." Similarly, file server 104 may provide second network file system client 112 with access to second server export portion 120 by giving client 112 permission to mount the file system portion "/hme/company_b."

In this example, the computer file with the filename "FILE_B" is a symbolic link that refers to the computer file having the filename "FILE_G," as indicated by arrow 124. However, FILE_G is not part of first server export portion 116 designated by server export path 118 ("/hme/company_a"). Rather, FILE G is part of second server export portion 120 designated by server export path 122 ("/hme/company_b"). Clients without permission to mount second server export portion 120 should not have access to files contained therein (unless the files are also contained in first server export portion 116). And yet, network file system clients with permission to access first server export portion 116 may be able to access FILE_G by virtue of being able to access the symbolic link FILE_B.

Accordingly, disclosed systems, methods and computer program products may be used to identify symbolic links such as FILE_B in network file systems. More particularly, paths exchanged between network file system clients and network file servers may be determined and examined to identify symbolic links. If one or more symbolic links are identified, various actions may be taken to ensure security is not breached, including prohibiting file access.

Figure 3:
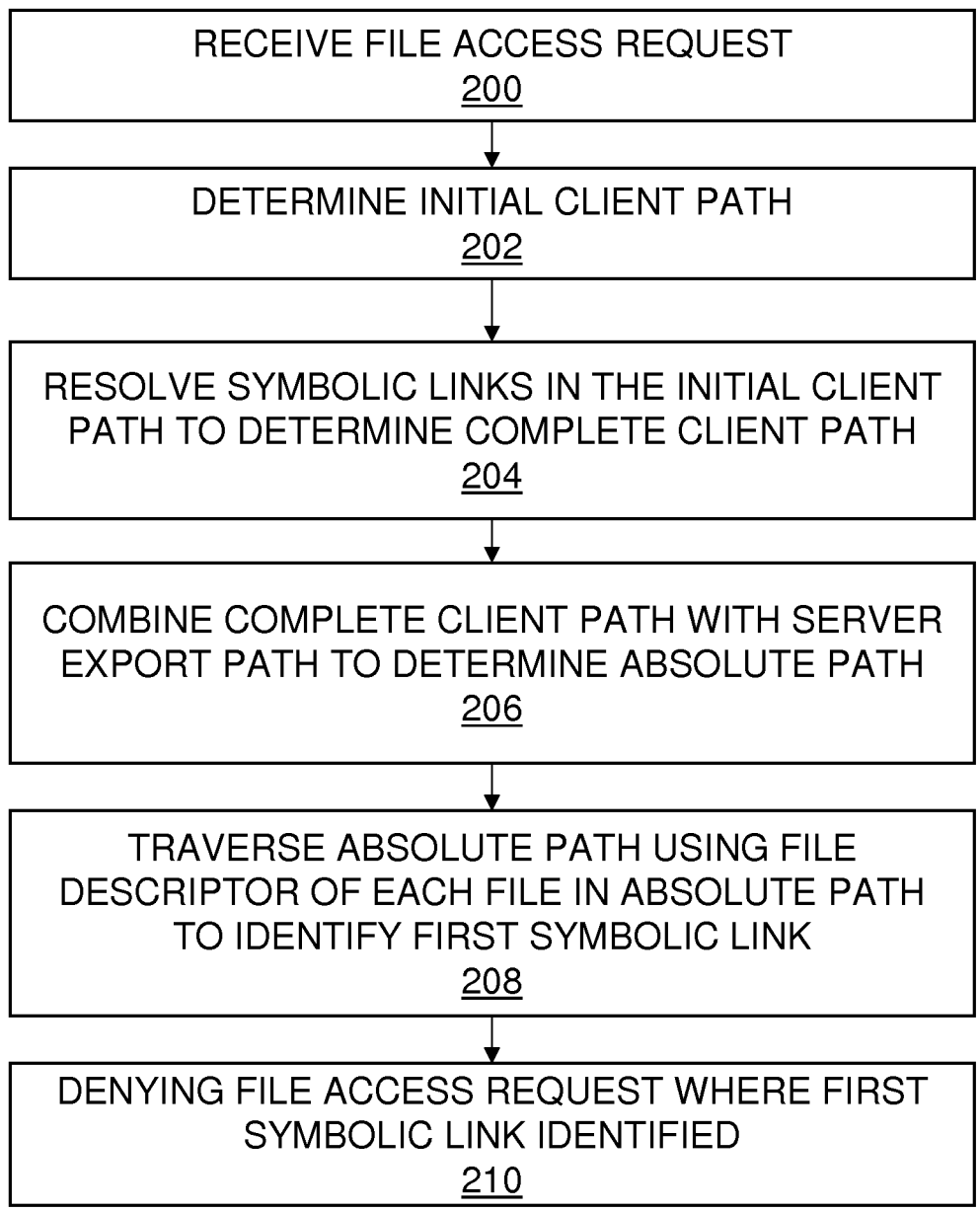
FIG. 3 depicts an exemplary method of receiving a file access request and determining whether a symbolic link is present in an absolute path determined in part from the file access request.

An exemplary method of a network file server receiving a file access request and determining whether a symbolic link is present in a path is depicted in FIG. 3. While these steps are shown in a particular order, this is not intended to be limiting, and these steps may be performed in various orders. Moreover, one or more of the steps may be omitted and/or steps may be added without departing from the spirit of the disclosure.

At 200, a file access request is received by a network file server such as file server 104 in FIG. 2. A file access request may be a communication from a network file system client (e.g., 108, 112) that seeks to create, alter, read, execute, delete or otherwise access temporarily or permanently a computer file. The computer file to which access is sought may be identified in a file access request in the form of a path. For example, a client desiring access to FILE_H of second server export portion 120 in FIG. 2 may send a file access request containing the initial client path "2008/FILE_H." At 202 of FIG. 3, the network file server may determine an initial client path from the file access request.

At 204, any symbolic or relative links that exist in the initial client path may be resolved at the network file server using various methods. For example, file server 104 in FIG. 2 may call realpath( ) in order to resolve symbolic links contained in the initial client path, as well as other types of shorthand links (e.g., "./", "../"). The output of realpath( ) may be a complete client path that identifies fully the location of the file-to-be-accessed within the portion exported to the client. In the example of FIG. 2, the initial client path "2008/FILE_H" does not include any symbolic or shorthand links, and so it is simply resolved to the complete client path of "2008/FILE_H."

In some embodiments, the initial client path may not be resolved on the network file server. Instead, a client may have the ability to resolve a path itself. Accordingly, in some embodiments, a network file system client such as 108 or 112 in FIG. 2 may resolve the initial client path into the complete client path locally and then include the complete client path with the file access request (200 of FIG. 3) sent to the network file server.

Regardless of whether the initial client path is resolved by a network file server or a network file system client, at 206, the complete client path is combined with a server export path (e.g., 118, 122 in FIG. 2) to determine an absolute path that points to the precise location of the computer file-to-be-accessed in the computer storage available to the network file server. In some embodiments, this includes concatenating the complete client path with the server export path.

Returning to the example above and referring to FIG. 2, the complete client path "2008/FILE_H" was resolved at 204. At 206, file server 104 may then concatenate server export path 122, "/hme/company_b/," with the complete client path "2008/FILE_H" to obtain "hme/company_b/2008/FILE_H," which is the absolute path to the file-to-be-accessed on the file system of first computer system 106.

At 208 of FIG. 3, the absolute path determined at 206 is traversed using a file descriptor of each file or directory in the absolute path to identify any symbolic links. A "file descriptor" as used herein is an identifier, other than a filename, of a computer file, directory or device. In POSIX environments (e.g., Unix, Linux), file descriptors may be integers. In Windows environments, file descriptors typically are referred to as "file handles," and may be tokens such as numbers that are used to identify or refer to open files or devices. File descriptors may be used as input parameters in system calls (e.g., open( ), openat( ), read( ), close( ) to designate which computer file is to be accessed.

Traversing the absolute path using a file descriptor of each file in the absolute path at 208 may be done in various ways. For example, the process may start at a root file or directory of the absolute path and sequentially attempt to open a file descriptor of each file or directory in the absolute path.

In some embodiments, such as embodiments where the file server is executing in a Unix or Linux environment, opening a file descriptor of each computer file or directory in the absolute path may be performed using an openat( ) operation. The openat( ) operation operates much in the same way as the standard open( ) operation in that, when successful, it returns a file descriptor. The openat( ) operation receives up to three parameters: directory file descriptor, pathname and flags. Unlike the open( ) operation, which by default starts from the current working directory, the openat( ) operation starts from the directory designated by the directory file descriptor. If input for the pathname parameter is relative, then it will be relative to the directory designated by the directory file descriptor parameter. If input for the pathname parameter is absolute, then the directory file descriptor parameter is ignored.

The flags parameter of the openat( ) operation may be populated by various values, such as constants defined in standard files like fcntl.h. The value or combination of values used for the flags parameter may cause the openat( ) operation to function in a particular way. For example, in order to cause the openat( ) operation to return an indication of whether a computer file or directory specified by the parameter pathname is a symbolic link, the O_NOFOLLOW value may be used as a flag.

Figure 4:
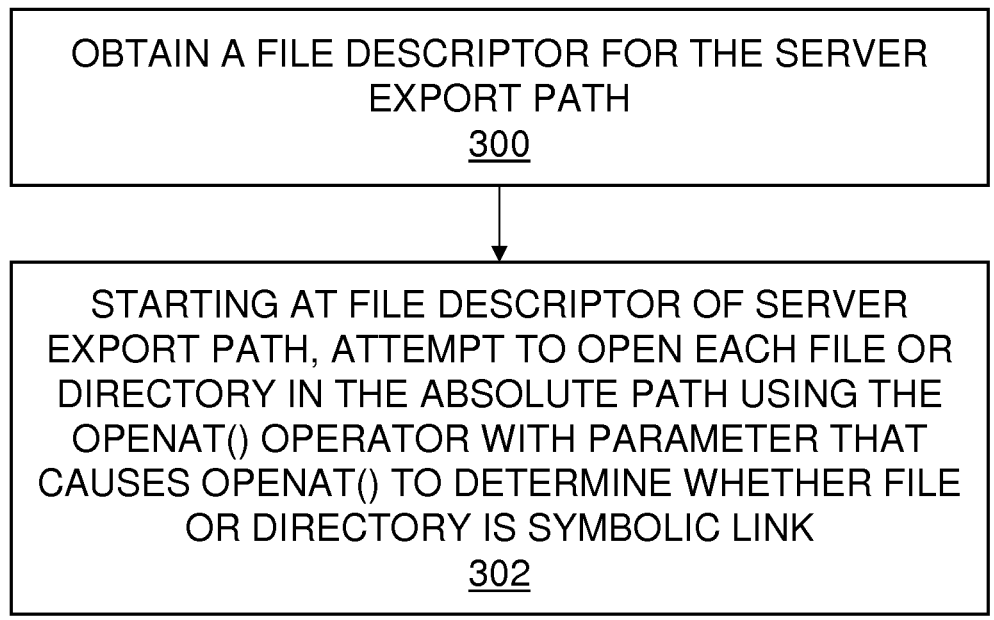
FIG. 4 depicts an exemplary method of traversing an absolute path using file descriptors to identify a symbolic link.

An exemplary method of traversing the absolute path is shown in FIG. 4. At 300, a file descriptor for the server export path is obtained. This may be accomplished by calling the opendir( ) operation with the server export path as input, which may return a file descriptor for that directory. At 302, beginning at file descriptor for the server export path, each file or directory included in the complete client path may be opened using the openat( ) operation. A first parameter may be included as input that causes the openat( ) operation to open a file or directory adjacent a file or directory in the absolute path that is represented by the file descriptor most recently returned by openat( ) (or opendir( ) if the method has not yet proceeded past 300). An example of this will be seen below. A second parameter (e.g., O_NOFOLLOW) also may be included in the openat( ) operation that causes openat( ) to determine whether a file or directory in the path is a symbolic link.

Returning to FIG. 3, identification of a symbolic link in the absolute path at 208 is highly indicative of an attack. The complete client path should not include any symbolic links, as those would have been resolved at 204. Thus, a symbolic link discovered in the absolute path is most likely caused by one of the computer files or directories in the absolute path being replaced with a symbolic link after resolution of the initial client path to the complete client path at 204.

Accordingly, at 210 of FIG. 3, the file access request received at 200 may be denied where one or more symbolic links are identified in the absolute path at 208. This ensures that attempts to replace computer files or directories in an absolute path with symbolic links during other processing do not result in an attacker gaining access to portions of storage to which they are not permitted access.

As another example, assume a network file server is configured to export the path "/home/exportsfs/," and assume a client wishes to access a computer file—"/dira/dirb/symlink/foo"—within the portion designated by the path, "/home/exportfs/." Assume the computer file "symlink" is a symbolic link referring to the computer file "./dirc/." The client sends a file access request (200 of FIG. 3) to the file server that includes an initial client path of "/dira/dirb/symlink/foo." The file server determines (202) the initial client path, and then resolves (204) the symbolic link "symlink" to "./dirc/", yielding "/dira/dirb/dirc/foo" as the complete client path. The file server then concatenates (206) the complete client path with the server export path to determine the absolute path: /home/exportfs/dira/dirb/dirc/foo.

Next, the file server traverses (208) the absolute path using the openat( ) operation with file descriptors and the O_NOFOLLOW flag as parameters. The following is exemplary pseudocode showing system calls that may be executed to traverse the absolute path:

rootfd=opendir(/home/exportfs)
fd1=openat(rootfd, dira, O_DIRECTORY|O_NOFOLLOW)
fd2=openat(fd1, dirb, O_DIRECTORY|O_NOFOLLOW)
fd3=openat(fd2, dirc, O_DIRECTORY|O_NOFOLLOW)
foo_fd=openat(fd3, foo, O_NOFOLLOW)

At each step, name of the computer file or directory that is adjacent the most recently returned file descriptor is used as input. Assuming no files had been replaced with symbolic links, each openat( ) function would return successfully, indicating that no symbolic links were present and that the client should be permitted access to the file "foo."

However, assume that after the initial client path is resolved (204) to the complete client path, but before the absolute path is traversed (208), a malicious user changes the directory "dira" to be a symbolic link that refers to "../../etc." Without traversing the absolute path as described herein, the absolute path would be resolved to "/home/exportfs/../../etc/dirb/dirc/foo." In other words, the effective path would be "/etc/dirb/dirc/foo." Because the /etc/ directory often contains sensitive data such as passwords, permitting the malicious user access to this directory poses a security risk.

Traversing absolute paths to identify symbolic links avoids this security risk. Even if a computer file or directory within an absolute path is replaced with a symbolic link concurrently with an attempt to access a computer file, the symbolic link will be identified during the traversal of the absolute path, and access to the file may be denied. In the present example, the above call "fd1=openat(rootfd, dira, O_DIRECTORY|O_NOFOLLOW)" would fail because "dira" has been replaced with a symbolic link. As a result, access to "foo" may be denied.

The flowchart and cluster diagrams in the figures illustrate the architecture, functionality, and operation of possible implementations of systems, methods and computer program products according to various embodiments of the present invention. In this regard, each cluster in the flowchart or cluster diagrams may represent a module, segment, or portion of code, which comprises one or more executable instructions for implementing the specified logical function(s). It should also be noted that, in some alternative implementations, the functions noted in the cluster may occur out of the order noted in the figures. For example, two clusters shown in succession may, in fact, be executed substantially concurrently, or the clusters may sometimes be executed in the reverse order, depending upon the functionality involved. It will also be noted that each cluster of the cluster diagrams and/or flowchart illustration, and combinations of clusters in the cluster diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or clusters thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of identifying a symbolic link in a path, comprising:
    determining, at a network file server, an absolute path having no symbolic links; and
    traversing, at the network file server, the determined absolute path using a file descriptor of each file in the absolute path to identify a first symbolic link that was inserted in the absolute path after the absolute path was determined, including starting at a root file or directory of the absolute path and sequentially attempting to open each file or directory in the absolute path,
    wherein opening each file is performed using an open operation with a first parameter that causes the open operation to open a file or directory that is adjacent a most recently returned file descriptor in the absolute path, and a second parameter that causes the open operation to determine whether the adjacent file or directory is a symbolic link,
    wherein the open operation is a specialized open operation that starts from a directory identified by the first parameter as opposed to a general-purpose open operation that starts from a current working directory.

2. The computer-implemented method of claim 1, further comprising:
    determining an initial client path;
    resolving any symbolic links in the initial client path to determine a complete client path; and
    combining, at the network file server, the complete client path with a server export path to determine the absolute path.

3. The computer-implemented method of claim 2, wherein resolving any symbolic links in the initial client path to determine the complete client path includes using realpath( ).

4. The computer-implemented method of claim 2, wherein resolving any symbolic links in the initial client path to determine the complete client path is performed by a client of the network file server.

5. The computer-implemented method of claim 2, wherein resolving any symbolic links in the initial client path to determine the complete client path is performed by a server of the network file server.

6. The computer-implemented method of claim 2, wherein combining the complete client path with the server export path to determine the absolute path includes concatenating the complete client path with the server export path.

7. The computer-implemented method of claim 1, wherein traversing the absolute path using a file descriptor of each file in the absolute path to identify a symbolic link includes obtaining a file descriptor for the server export path.

8. The computer-implemented method of claim 7, further comprising starting at the file descriptor for the server export path and sequentially attempting to open each file or directory in the absolute path.

9. The computer-implemented method of claim 1, wherein the open operation is an openat( ) operation.

10. The computer-implemented method of claim 9, further comprising receiving, at the network file server, a file access request from which the absolute path is at least partially determined.

11. The computer-implemented method of claim 10, further comprising denying the file access request where it is determined during performance of the openat( ) operation that the adjacent file or directory is a symbolic link.

12. The computer-implemented method of claim 1, further comprising receiving, at the network file server and from a network file client, a file access request to access a computer file, the file access request including an initial path to the computer file.

13. The computer-implemented method of claim 12, wherein determining, at a network file server, an absolute path includes determining, at the network file server, an absolute path based on the initial path.

14. The computer-implemented method of claim 13, further comprising denying, at the network file server, the file access request when the first symbolic link is identified in the absolute path.

15. A computer program product for executing a network file server on a computer, said computer program product including a plurality of computer executable instructions stored on a non-transitory computer-readable medium, wherein said instructions are executed by the computer to:
determine a complete client path from an initial client path;
combine the complete client path with a server export path to generate an absolute path having no symbolic links; and
traverse the determined absolute path using a file descriptor of each file in the absolute path to identify a first symbolic link that was inserted in the absolute path after the absolute path was determined, including starting at a root file or directory of the absolute path and sequentially attempting to open each file or directory in the absolute path,
wherein opening each file is performed using an open operation with a first parameter that causes the open operation to open a file or directory that is adjacent a most recently returned file descriptor in the absolute path, and a second parameter that causes the open operation to determine whether the adjacent file or directory is a symbolic link,
wherein the open operation is a specialized open operation that starts from a directory identified by the first parameter as opposed to a general-purpose open operation that starts from a current working directory.

16. The computer program product of claim 15, wherein determining the complete client path from the initial client path is performed by one of:
a network file system client;
the computer executing the network file server.

17. The computer program product of claim 15, wherein determining the complete client path from the initial client path includes using realpath( ) with the initial client path as input.

18. The computer program product of claim 15, wherein combining the complete client path with the server export path to generate the absolute path includes concatenating the complete client path with the server export path.

19. A network file system, comprising:
a processor;
a memory; and
a network file server program including a plurality of instructions stored in the memory that are executed by the processor to:
receive a file access request from a client of the network file system;
concatenate a complete client path determined from the file access
request with a server export path to determine an absolute path having no symbolic links;
traverse the determined absolute path using a file descriptor of each file in the absolute path to identify a first symbolic link that was inserted in the absolute path after the absolute path was determined;
obtain a file descriptor for the server export path;
starting at the file descriptor for the server export path, sequentially attempt to open each file or directory in the absolute path; and
open each file using an open operation with a first parameter that causes the open operation to open a file or directory that is adjacent a most recently returned file descriptor in the absolute path, and a second parameter that causes the open operation to determine whether the adjacent file or directory is a symbolic link,
wherein the open operation is a specialized open operation that starts from a directory identified by the first parameter as opposed to a general-purpose open operation that starts from a current working directory.

20. The system of claim 19, wherein the plurality of instructions further includes instructions that are executed by the processor to deny the file access request where a first symbolic link is identified.

* * * * *